(12) United States Patent
Pelle et al.

(10) Patent No.: US 12,466,952 B2
(45) Date of Patent: Nov. 11, 2025

(54) THERMALLY CONDUCTIVE SILICONE COMPOSITIONS

(71) Applicant: Elkem Silicones France SAS, Lyons (FR)

(72) Inventors: Aurelie Pelle, Saint Quentin Fallavier (FR); Lucile Fauvre, Lyons (FR); Julie Dubois, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 510 days.

(21) Appl. No.: 18/003,206

(22) PCT Filed: Jun. 24, 2021

(86) PCT No.: PCT/FR2021/000066
§ 371 (c)(1),
(2) Date: Dec. 23, 2022

(87) PCT Pub. No.: WO2021/260279
PCT Pub. Date: Dec. 30, 2021

(65) Prior Publication Data
US 2023/0250283 A1 Aug. 10, 2023

(30) Foreign Application Priority Data
Jun. 25, 2020 (FR) ...................... 2006652

(51) Int. Cl.
*C08K 3/02* (2006.01)
*C08J 3/24* (2006.01)
*C08K 3/22* (2006.01)
*C08L 83/04* (2006.01)

(52) U.S. Cl.
CPC ............... *C08L 83/04* (2013.01); *C08J 3/24* (2013.01); *C08K 3/02* (2013.01); *C08K 3/22* (2013.01); *C08J 2383/07* (2013.01); *C08K 2003/023* (2013.01); *C08K 2003/2227* (2013.01); *C08K 2201/001* (2013.01)

(58) Field of Classification Search
CPC ................................................ C08K 2003/023
See application file for complete search history.

(56) References Cited

U.S. PATENT DOCUMENTS

| 4,292,223 | A | 9/1981 | Theodore et al. | |
| 6,524,549 | B1 * | 2/2003 | Mohri | C01F 7/30 423/625 |
| 11,578,245 | B2 * | 2/2023 | Ota | C08L 83/04 |
| 2002/0022127 | A1 * | 2/2002 | Katsuda | C01F 7/02 524/430 |
| 2003/0125418 | A1 * | 7/2003 | Shibusawa | C01F 7/02 423/625 |
| 2008/0067477 | A1 * | 3/2008 | Hayakawa | H01B 1/24 252/511 |
| 2011/0256051 | A1 * | 10/2011 | Sawano | C01F 7/441 423/629 |
| 2016/0122611 | A1 * | 5/2016 | Yoshida | G03G 15/2057 252/78.3 |
| 2019/0161666 | A1 | 5/2019 | Tanigawa et al. | |
| 2023/0134132 | A1 * | 5/2023 | Komaki | C09K 5/14 423/625 |
| 2025/0140987 | A1 * | 5/2025 | Takahashi | H01M 10/653 |

FOREIGN PATENT DOCUMENTS

| EP | 1788031 A1 | 5/2007 |
| EP | 3372630 A1 | 9/2018 |
| JP | S52-4573 A | 1/1977 |
| JP | 2000-063670 A | 2/2000 |
| JP | 2007-311628 A | 11/2007 |
| KR | 2012-0086249 A | 8/2012 |

OTHER PUBLICATIONS

International Search Report and Written Opinion mailed Aug. 18, 2021 in International Application No. PCT/FR2021/000066, and English translation of International Search Report (13 pages).

* cited by examiner

*Primary Examiner* — Margaret G Moore
(74) *Attorney, Agent, or Firm* — McBee, Moore & Vanik IP, LLC

(57) ABSTRACT

The present invention relates to organopolysiloxane compositions comprising an organopolysiloxane having, per molecule, at least two alkenyl groups, an organopolysiloxane having, per molecule, at least two SiH units, a hydrosilylation catalyst, and a thermally conductive filler, the thermally conductive filler comprising at least 40% by weigh of metallic silicon, and a specific particle size distribution. The invention further relates to a silicone elastomer which can be obtained by cross-linking and/or curing the composition, as well as its use as a thermally conductive material for coating or filling, in particular for the automotive field, in particular for the field of electric vehicles.

13 Claims, No Drawings

THERMALLY CONDUCTIVE SILICONE COMPOSITIONS

CROSS-REFERENCE TO RELATED APPLICATIONS

This application is the National Stage entry of International Application No. PCT/FR2021/000066, filed 24 Jun. 2021, which claims priority to France No. 2006652, filed 25 Jun. 2020.

BACKGROUND

Field

The present invention relates to new, polyaddition-crosslinking organopolysiloxane compositions for production of thermally conductive elements particularly for the automotive field, more particularly for the field of electric vehicles.

Description of Related Art

Thermally conductive silicone elastomers are well known for their significant heat transfer, hot and cold thermal resistance, and electrical insulation properties. They are used particularly in electrical and electronic applications, and in automotive fields. Especially in the automotive field, the thermally conductive silicone elastomers are used in batteries for electrical vehicles and hybrid vehicles ("EV" and "HEV" as they are abbreviated) to remove the heat from the battery block cells and from the on-board electronics.

Thermally conductive silicone formulations have been described in the prior art. As early as in 1981, U.S. Pat. No. 4,292,223 described thermally conductive elastomers comprising organo-polysiloxanes, a particulate filler, and a viscosity modifier. The particulate filler comprises silica and a thermally conductive metal powder. The weight content of metal powder, however, is only from 0.5:1 to 2.5:1, as the mass ratio of powder to polymer, and the maximum thermal conductivity obtained is only $11.7 \times 10^{-4}$ cal/s·cm·°C., or 0.5 W/m·K, which is not sufficient for the desired applications. It is presently desirable to obtain a thermal conductivity of more than 2.0 W/m·K, preferably at least 3.0 W/m·K.

Metal oxide powders are traditionally employed in order to enhance the thermal conductivity of elastomers, examples being aluminum trihydrate (ATH), aluminum oxide and/or magnesium oxide (see, for example, patent application US 2019/0161666). However, the addition of these thermally conductive fillers at a very high concentration causes an increase in the density of the elastomer. For the fields of application envisaged, such as automotive, the density of the elastomer material is a very important property. It is desirable to obtain a thermally conductive elastomer material having a density of preferably less than 4 $g/cm^3$, more preferably less than 3 $g/cm^3$, more preferably less than 2.5 $g/cm^3$, and more preferably still less than 2 $g/cm^3$.

Patent application JP 2000-063670 describes a thermally conductive silicone elastomer containing metallic silicon as thermally conductive filler. Patent EP 1.788.031 also describes the use of metallic silicon powder in silicone elastomers as a thermally conductive filler to give a high thermal conductivity and a good storage stability. The maximum thermal conductivity obtained in this document, however, is between 0.6 W/m·K and 1.0 W/m·K. Similarly, patent application JP 2007-311628 describes a thermally conductive elastomer film in which a metallic silicon powder is used as thermally conductive filler and electrical insulator. Said metallic silicon powder preferably has a particle size of less than 20 µm. Patent application KR 20120086249 describes a method for preparing a thermally conductive silicone elastomer containing a thermally conductive filler in powder form and a hollow organic resin filler. According to that document, a thermally conductive powder having particles whose diameter is between 3 and 15 µm is preferably used. It is specified that the resulting silicone elastomer can have a thermal conductivity of between 0.15 W/m·K and 3.0 W/m·K. In the examples, however, the thermal conductivity does not exceed 0.41 W/m·K.

In another technical field, patent JP524573 describes thermally conductive heat-sealing strips and rolls using a silicone elastomer layer comprising a metallic silicon powder. The thermal conductivity obtained is 2 W/m·K.

It would be desirable to have a thermally conductive silicon elastomer possessing not only a high thermal conductivity, preferably more than 2.0 W/m·K or 3.0 W/m·K, but also a low density, preferably less than 3 $g/cm^3$ or than 2 $g/cm^3$. It is necessary, moreover, for this silicone elastomer to have a consistency such that it can be employed and used in the desired technical fields. The inventors, indeed, have found that the composition may become powdery if the fillers are poorly selected, and preparation of the elastomer in that case becomes impossible.

The object of the present invention is to provide a new, thermally conductive organopolysiloxane composition which solves the problems mentioned above and which possesses a high thermal conductivity, a low density, and good processing properties.

SUMMARY

A subject of the present invention is an organopolysiloxane composition X comprising:
- at least one organopolysiloxane A having per molecule at least two silicon-bonded $C_2$-$C_6$ alkenyl groups,
- at least one organopolysiloxane B having per molecule at least two SiH units,
- a catalytically effective amount of at least one hydrosilylation catalyst C, and
- a thermally conductive filler D, characterized in that
said thermally conductive filler D comprises at least 40% by weight of metallic silicon,
said thermally conductive filler D comprises between 3% and 22% of particles having a diameter of less than or equal to 2 µm, and the particle size distribution is such that the ratio d90/d10 of said filler is greater than or equal to 20.

Another subject of the present invention concerns a two-component system P which is a precursor of the organopolysiloxane composition X as defined above and which comprises the constituents A, B, C, and D as defined above, said two-component system P being characterized in that it takes the form of two separate parts, P1 and P2, which are intended for mixing to form said organopolysiloxane composition X, and in that one of the parts, P1 or P2, comprises the catalyst C and does not comprise the organopolysiloxane B, whereas the other part, P1 or P2, comprises the organopolysiloxane B and does not comprise the catalyst C.

Another subject of the present invention concerns a silicone elastomer obtainable by crosslinking and/or curing the organopolysiloxane composition X as defined above, and also the use of the silicone elastomer as a thermally conductive coating or filling material, particularly for the automotive field, more particularly for the field of electric vehicles.

Another subject of the present invention concerns a process for preparing a silicon elastomer, comprising the following steps:
  a) supplying a two-component system P comprising all of the components of the organo-polysiloxane composition X as defined above;
  b) mixing the two parts of said two-component system P to give the organopolysiloxane composition X; and
  c) crosslinking and/or curing said organopolysiloxane composition X to give said silicone elastomer.

Lastly, a subject of the present invention is an intermediate composition comprising:
  at least one organopolysiloxane A having per molecule at least two silicon-bonded $C_2$-$C_6$ alkenyl groups, and
  a thermally conductive filler D,
characterized in that
said thermally conductive filler D comprises at least 40% by weight of metallic silicon,
said thermally conductive filler D comprises between 3% and 22% of particles having a diameter of less than or equal to 2 μm, and the particle size distribution is such that the ratio d90/d10 of said filler is greater than or equal to 20.

DETAILED DESCRIPTION OF A PREFERRED EMBODIMENT

Unless otherwise indicated, all of the viscosities of the silicone oils involved in the present specification correspond to a "Newtonian" dynamic viscosity parameter at 25° C., meaning that the dynamic viscosity is measured, conventionally, using a Brookfield viscometer with a shear rate gradient which is low enough for the viscosity measured to be independent of the rate gradient.

The organopolysiloxane composition X according to the present invention comprises at least the following components A, B, C, and D:
  an organopolysiloxane A having per molecule at least two silicon-bonded $C_2$-$C_6$ alkenyl groups,
  an organopolysiloxane B having per molecule at least two SiH units,
  a hydrosilylation catalyst C, and
  a thermally conductive filler D.

The organopolysiloxane A having per molecule at least two silicon-bonded $C_2$-$C_6$ alkenyl groups may especially be formed:
  of at least two siloxyl units of formula as follows:
    $Y_a R^1_b SiO_{(4-a-b)/2}$
  in which:
  Y is a $C_2$-$C_6$ alkenyl, preferably vinyl,
  $R^1$ is a monovalent hydrocarbon group having from 1 to 12 carbon atoms, preferably selected from alkyl groups having from 1 to 8 carbon atoms such as methyl, ethyl and propyl groups, cycloalkyl groups having from 3 to 8 carbon atoms, and aryl groups having from 6 to 12 carbon atoms, and
  a=1 or 2, b=0, 1 or 2 and the sum a+b=1, 2 or 3; and
  optionally of units of formula as follows: $R^1_c SiO_{(4-c)/2}$ in which $R^1$ has the same meaning as above and c=0, 1, 2 or 3.

It is appreciated in the formulas above that, if two or more groups $R^1$ are present, they may be identical to or different from one another.

These organopolysiloxanes A may have a linear structure, essentially consisting of siloxyl units "D" selected from the group consisting of siloxyl units $Y_2SiO_{2/2}$, $YR^1SiO_{2/2}$, and $R^1_2SiO_{2/2}$, and of terminal siloxyl units "M" selected from the group consisting of siloxyl units $YR^1_2SiO_{1/2}$, $Y_2R^1SiO_{1/2}$, and $R^1_3SiO_{1/2}$. The symbols Y and $R^1$ are as described above.

Examples of terminal "M" units include trimethylsiloxy, dimethylphenylsiloxy, dimethylvinylsiloxy or dimethylhexenylsiloxy groups.

Examples of "D" units include dimethylsiloxy, methylphenylsiloxy, methylvinylsiloxy, methylbutenylsiloxy, methylhexenylsiloxy, methyldecenylsiloxy or methyldecadienylsiloxy groups.

Examples of linear organopolysiloxanes as candidate organopolysiloxanes A according to the invention are:
  a poly(dimethylsiloxane) with dimethylvinylsilyl ends;
  a poly(dimethylsiloxane-co-methylphenylsiloxane) with dimethylvinylsilyl ends;
  a poly(dimethylsiloxane-co-methylvinylsiloxane) with dimethylvinylsilyl ends;
  a poly(dimethylsiloxane-co-methylvinylsiloxane) with trimethylsilyl ends; and
  a cyclic poly(methylvinylsiloxane).

In the most recommended form, the organopolysiloxane A contains terminal dimethylvinylsilyl units, and more preferably still the organopolysiloxane A is a poly(dimethylsiloxane) with dimethylvinylsilyl ends.

A silicone oil generally has a viscosity of between 1 mPa·s and 2 000 000 mPa·s. Said organo-polysiloxanes A are preferably oils with a dynamic viscosity of between 20 mPa·s and 100 000 mPa·s, preferably between 20 mPa·s and 80 000 mPa·s at 25° C., and more preferably between 100 mPa·s and 50 000 mPa·s.

The organopolysiloxanes A may optionally further contain siloxyl units "T" ($R^1SiO_{3/2}$) and/or siloxyl units "Q" ($SiO_{4/2}$). The symbols $R^1$ are as described above. The organopolysiloxanes A in that case have a branched structure. Examples of branched organopolysiloxanes as candidate organopolysiloxanes A according to the invention are:
  a poly(dimethylsiloxane)(methylsiloxane) with trimethylsilyl and dimethylvinylsilyl ends, consisting of trimethylsiloxy "M", dimethylvinylsiloxy "M", dimethylsiloxy "D", and methylsiloxy "T" units;
  a resin consisting of trimethylsiloxy "M", dimethylvinylsiloxy "M", and "Q" units; and
  a resin consisting of trimethylsiloxy "M", methylvinylsiloxy "D", and "Q" units.

According to one embodiment, however, the organopolysiloxane composition X does not comprise branched organopolysiloxanes or resins comprising $C_2$-$C_6$ alkenyl units.

The organopolysiloxane compound A preferably has a mass content of alkenyl unit at between 0.001% and 30%, preferably between 0.01% and 10%, preferably between 0.02 and 5%.

The organopolysiloxane composition X comprises preferably from 5% to 30% of organo-polysiloxane A, more preferably from 8% to 15% by weight of organopolysiloxane A, relative to the total weight of the organopolysiloxane composition X.

The organopolysiloxane composition X may comprise a single organopolysiloxane A or a mixture of two more organopolysiloxanes A having, for example, different viscosities and/or different structures.

The organopolysiloxane B is an organohydrogenopolysiloxane compound comprising per molecule at least two, and preferably at least three, hydrogenosilyl functions or units Si—H. The organopolysiloxane composition X may comprise a single organohydrogenopolysiloxane B or a mixture of two more organohydrogenopolysiloxanes B having, for example, different viscosities and/or different structures.

The organohydrogenopolysiloxane B may advantageously be an organopolysiloxane comprising at least two preferably at least three, siloxyl units of formula as follows:

$$H_d R^2_e SiO_{(4-d-e)/2}$$

in which:
the radicals $R^2$, which are identical or different, represent a monovalent radical having from 1 to 12 carbon atoms, d=1 or 2, e=0, 1 or 2 and d+e=1, 2 or 3;
and optionally other units of formula as follows: $R^2_f SiO_{(4-f)/2}$
in which $R^2$ has the same meaning as above, and f=0, 1, 2 or 3.

It will be appreciated in the formulas above that, if two or more groups $R^2$ are present, they may be identical to or different from one another. $R^2$ may preferably represent a monovalent radical selected from the group consisting of alkyl groups having 1 to 8 carbon atoms, optionally substituted by at least one halogen atom such as chlorine or fluorine; cycloalkyl groups having from 3 to 8 carbon atoms; and aryl groups having from 6 to 12 carbon atoms. $R^2$ may advantageously be selected from the group consisting of methyl, ethyl, propyl, 3,3,3-trifluoro-propyl, xylyl, tolyl, and phenyl.

In the formula above, the symbol d is preferably 1.

The organohydrogenopolysiloxane B may have a linear, branched or cyclic structure. The degree of polymerization is preferably greater than or equal to 2. Generally it is less than 5000. When the polymers are linear, they essentially consist of siloxyl units selected from the units with formulas as follows: D: $R^2_2SiO_{2/2}$ or D': $R^2HSiO_{2/2}$, and of terminal siloxyl units selected from the units with formulas as follows: M: $R^2_3SiO_{1/2}$ or M': $R^2_2HSiO_{1/2}$, where $R^2$ has the same meaning as above.

Examples of organohydrogenopolysiloxanes as candidate organopolysiloxanes B according to the invention, comprising at least two hydrogen atoms bonded to a silicon atom, are:
a poly(dimethylsiloxane) with hydrogenodimethylsilyl ends;
a poly(dimethylsiloxane-co-methylhydrogenosiloxane) with trimethylsilyl ends;
a poly(dimethylsiloxane-co-methylhydrogenosiloxane) with hydrogenodimethylsilyl ends;
a poly(methylhydrogenosiloxane) with trimethylsilyl ends; and
a cyclic poly(methylhydrogenosiloxane).

When the organohydrogenopolysiloxane B has a branched structure, it is preferably selected from the group consisting of the silicone resins with formulas as follows:
M'Q in which the hydrogen atoms bonded to silicon atoms are carried by the groups M,
MM'Q in which the hydrogen atoms bonded to silicon atoms are carried by some of the units M,
MD'Q in which the hydrogen atoms bonded to silicon atoms are carried by the groups D,
MDD'Q in which the hydrogen atoms bonded to silicon atoms are carried by some of the groups D,
MM'TQ in which the hydrogen atoms bonded to silicon atoms are carried by some of the units M,
MM'DD'Q in which the hydrogen atoms bonded to silicon atoms are carried by some of the units M and D,
and mixtures thereof, where M, M', D and D' are as defined above, T is a siloxyl unit of formula $R^2_3SiO_{1/2}$, and Q is a siloxyl unit of formula $SiO_{4/2}$, where $R^2$ has the same meaning as above.

The organohydrogenopolysiloxane compound B preferably has a mass content of hydrogeno-silyl functions Si—H of between 0.2% and 91%, more preferably between 3% and 80%, and more preferably still between 15% and 70%.

Considering the entirety of the organopolysiloxane composition X, the molar ratio of the hydrogenosilyl functions Si—H to the alkene functions may advantageously be between 0.2 and 20, preferably between 0.5 and 15, more preferably between 0.5 and 10, and more preferably still between 0.5 and 5.

The viscosity of the organohydrogenopolysiloxane B is preferably between 1 mPa·s and 5000 mPa·s, more preferably between 1 mPa·s and 2000 mPa·s, and more preferably still between 5 mPa·s and 1000 mPa·s.

The organopolysiloxane composition X comprises preferably from 0.1% to 10% of organo-hydrogenopolysiloxane B, and more preferably from 0.5% to 5% by weight, relative to the total weight of the organopolysiloxane composition X.

The hydrosilylation catalyst C may particularly be selected from platinum compounds and rhodium compounds, but also from silicon compounds such as those described in patent applications WO 2015/004396 and WO 2015/004397, germanium compounds such as those described in patent applications WO 2016/075414, or nickel, cobalt or iron complexes such as those described in patent applications WO 2016/071651, WO 2016/071652, and WO 2016/071654. The catalyst C is preferably a compound derived from at least one metal belonging to the platinum group. These catalysts are well known. Use may be made more particularly of complexes of platinum with an organic product described in U.S. Pat. Nos. 3,159,601, 3,159,602, 3,220,972 and European patents EP 0 057 459, EP 0 188 978, and EP 0 190 530, and complexes of platinum with vinyl organosiloxanes as described in U.S. Pat. Nos. 3,419,593, 3,715,334, 3,377,432, and 3,814,730.

The catalyst C is preferably a compound derived from platinum. In that case, the amount by weight of catalyst C, calculated as the weight of platinum metal, is generally between 2 ppm and 400 ppm by mass, preferably between 5 ppm and 200 ppm by mass, based on the total weight of the composition X.

The catalyst C is preferably a Karstedt platinum.

The organopolysiloxane composition X according to the present invention is characterized in that it comprises a thermally conductive filler D. This filler may consist of a single filler or of a mixture of fillers which differ in their chemical nature and/or structure and/or particle size. According to one preferred embodiment of the present invention, the thermally conductive filler D consists of a mixture of at least two fillers or of at least three fillers which differ in their chemical nature and/or particle size. According to another preferred embodiment of the present invention, the thermally conductive filler D consists of a single filler.

The total weight of the thermally conductive filler D in the organopolysiloxane composition X is preferably greater than 70%, more preferably greater than 75%, and more preferably still between 80% and 95%, by weight relative to the total weight of the organopolysiloxane composition X. According to one particularly advantageous embodiment of the present invention, the total weight of the thermally conductive filler D in the organopolysiloxane composition X is greater than or equal to 85%. This particularly high content of thermally conductive filler makes it possible to attain very high thermal conductivities.

Said thermally conductive filler D comprises at least 40% by weight of metallic silicon, preferably at least 50% by weight, more preferably at least 60% by weight, more preferably at least 70% by weight, and more preferably still at least 80% by weight.

According to a first embodiment, the thermally conductive filler D comprises between 60% and 99.99% by weight of metallic silicon, preferably between 65% and 99.95% by weight, more preferably between 70% and 99.9% by weight, more preferably between 70% and 99% by weight, more preferably between 75% and 97% by weight, more preferably between 80% and 95% by weight.

Apart from the metallic silicon, the thermally conductive filler D may contain one or more other, different fillers known to the skilled person to have thermally conductive properties, especially from among metals, alloys, metal oxides, metal hydroxides, metal nitrides, metal carbides, metal silicides, carbon, soft magnetic alloys, and ferrites. The thermal conductivity of these fillers is preferably greater than 10 W/m·K, more preferably greater than 20 W/m·K, and more preferably still greater than 50 W/m·K. They may especially be selected from the group consisting of alumina, aluminum trihydrate (ATH), aluminum, silicon carbide, silicon nitride, magnesium oxide, magnesium carbonate, boron nitride, zinc oxide, aluminum nitride, and carbon, as for example carbon black, diamond, carbon nanotubes, graphite, and graphene. The thermally conductive filler D may preferably comprise not only metallic silicon but also a thermally conductive filler selected from the group consisting of an alumina filler, an aluminum trihydrate (ATH) filler, an aluminum filler, a silica filler, a zinc oxide filler, an aluminum nitride filler, a boron nitride filler, and mixtures thereof. More preferably still, the thermally conductive filler D may comprise in addition to the metallic silicon, in addition to the metallic silicon, a thermally conductive filler selected from the group consisting of an alumina filler, an aluminum trihydrate (ATH) filler, a zinc oxide filler, a silica filler, and mixtures thereof. The thermally conductive filler D may comprise between 0.01% and 60% by weight of thermally conductive filler which is not metallic silicon, preferably between 0.05% and 50% by weight, more preferably between 0.1% and 40% by weight, more preferably between 1% and 30% by weight, more preferably between 3% and 25% by weight, more preferably between 5% and 20% by weight.

According to another embodiment, the thermally conductive filler D comprises 100% by weight of metallic silicon, i.e., the thermally conductive filler D consists of metallic silicon, to the exclusion of any other, chemically different thermally conductive filler. Hence preferably:
  the organopolysiloxane composition X contains no alumina, and/or
  the organopolysiloxane composition X contains no aluminum trihydrate (ATH), and/or
  the organopolysiloxane composition X contains no zinc oxide, and/or
  the organopolysiloxane composition X contains no silica.

The thermally conductive filler D according to the invention possesses certain particle size characteristics.

Firstly, the thermally conductive filler D comprises between 3% and 22% (by volume) of particles having a diameter of less than or equal to 2 μm (micrometers). More preferably the thermally conductive filler D comprises between 3% and 20% (by volume) of particles having a diameter of less than or equal to 2 μm (micrometers). More preferably still, the thermally conductive filler D comprises between 6% and 18% (by volume) of particles having a diameter of less than or equal to 2 μm.

Secondly, the particle size distribution is such that the ratio d90/d10 of said filler is greater than or equal to 20. More preferably the particle size distribution is such that the ratio d90/d10 of said filler is greater than or equal to 30. The ratio d90/d10 of said filler may advantageously be less than 200, preferably less than 100.

In the present text, the particle size of the fillers is measured by a laser diffraction method. The content of particles having a diameter of less than or equal to 2 μm is a volume content, obtained by summing the volume of all of the particles having a diameter as measured by laser diffraction of less than or equal to 2 μm. "d90" corresponds to the characteristic diameter corresponding to 90% of the cumulative volume frequency of the particle size distribution of the filler. "d10" corresponds to the characteristic diameter corresponding to 10% of the cumulative volume frequency of the particle size distribution of the filler.

The thermally conductive filler or fillers may have a specific surface area, measured according to BET methods, of at least 0.1 m$^2$/g. The specific surface area is typically less than or equal to 3000 m$^2$/g. The thermally conductive filler or fillers may preferably have a specific surface area, measured according to BET methods, of between 0.1 m$^2$/g and 100 m$^2$/g, or even between 0.1 m$^2$/g and 10 m$^2$/g.

The thermally conductive filler D may have any shape known to the skilled person—for example, a spherical shape, a needle shape, a disk shape, a rod shape, or else an indefinite shape. The thermally conductive filler preferably has a spherical shape or an indefinite shape. When different thermally conductive fillers are used as mixtures, they may have the same shape or different shapes.

The metallic silicon thermally conductive filler may be obtained by any method well known to the skilled person. According to a first embodiment, the metallic silicon thermally conductive filler is a powder obtained by chemical reduction of silica followed by grinding in a crusher or an industrial mill. According to a second embodiment, the metallic silicon thermally conductive filler is a powder obtained from fragments of metallic silicon wafers and chips from the semiconductor industry that have been finely cut up or ground. According to a third embodiment, the metallic silicon thermally conductive filler is a spherical powder obtained by high-temperature melting of metallic silicon, by atomizing the molten silicon and then cooling or solidifying the resultant spherical particles. The metallic silicon may be monocrystalline or polycrystalline. The metallic silicon thermally conductive filler may be classified according to the methods known to the skilled person, for example by dry classification or by wet classification, or by a succession of multiple, identical or different, classifying steps.

The metallic silicon thermally conductive filler is typically pure at more than 50%, or at more than 80%, or at more than 95% (by weight). It is known, however, that the surface of a metallic silicon filler may be covered with a layer of silicon oxide. The appearance of this silicon oxide layer may be natural or brought about by certain treatments. It may advantageously endow the filler with better heat stability.

The metallic silicon thermally conductive filler or fillers may be used as they are or they may undergo a surface treatment. The typical purpose of said surface treatment is to improve the dispersibility of the filler in the organopolysiloxane composition and/or to improve the heat stability of the composition. Furthermore, the heat treatment may make it possible to improve the physical stability of the composition, by preventing the phenomena of settling or exudation, or else of increase in viscosity.

Said surface treatment may be a heat treatment, a chemical treatment, a physical treatment, or combinations thereof, especially the combination of a chemical treatment and a chemical treatment.

According to a preferred embodiment, the metallic silicon thermally conductive filler may be treated with organosilicon compounds commonly used for this purpose. The organo-polysiloxane composition X according to the invention may therefore comprise an agent for treating the thermally conductive filler E. These agents include:

organosiloxanes, especially methylpolysiloxanes such as hexamethyldisiloxane and octamethylcyclotetrasiloxane, organosilazanes, especially methylpolysilazanes such as hexamethyldisilazane, divinyltetramethyldisilazane, and hexamethylcyclotrisilazane, chlorosilanes such as dimethyldichlorosilane, trimethylchlorosilane, methylvinyldichlorosilane, and dimethylvinylchlorosilane, alkoxysilanes such as methyltrimethoxysilane, methyltriethoxysilane, phenyltrimethoxysilane, ethyltrimethoxysilane, n-propyltrimethoxysilane, octyltrimethoxysilane, vinyltrimethoxysilane, dimethylvinylethoxysilane, vinyltri(2-methoxyethoxy)silane, vinyltriacetoxysilane, allyltrimethoxysilane, butenyltrimethoxysilane, hexenyltrimethoxysilane, gamma-methacryloxypropyltrimethoxy silane, dimethyldimethoxysilane, dimethyldiethoxysilane, diphenyldimethoxysilane, trimethylmethoxysilane, and trimethylethoxysilane.

More preferably, the metallic silicon thermally conductive filler may be treated with an alkoxy silane, especially octyltrimethoxysilane, or with an organosilazane, especially hexamethyldisilazane (HMDZ) and divinyltetramethyldisilazane, or a mixture thereof, especially a mixture of HMDZ and divinyltetramethyldisilazane. When the thermally conductive filler is treated with a chemical agent, especially with an organosilazane, water may typically be added.

The organopolysiloxane composition X comprises preferably from 0.1% to 5% of an agent for treating the thermally conductive filler E, and more preferably from 1% to 3% by weight, relative to the total weight of the organopolysiloxane composition X.

A thermal treatment of the metallic silicon thermally conductive filler may involve subjecting said filler to a temperature of between 100° C. and 200° C. for a time of between 1 hour and 4 hours.

Physical treatment refers to the addition to the thermally conductive filler of a physical treatment agent which interacts with said filler essentially physically and not chemically, as for example by ionic interaction or by hydrogen bonds. A physical treatment agent may typically be an organopolysiloxane comprising OH in groups.

According to one embodiment, the surface treatment may be carried out before the thermally conductive filler is incorporated into the organopolysiloxane composition. According to an alternative embodiment, the thermally conductive filler may be treated in situ, during the preparation of the organopolysiloxane composition.

Further to the components A, B, C, and D already mentioned above, the organopolysiloxane composition X according to the present invention may optionally comprise other components.

According to one embodiment, the organopolysiloxane composition X according to the present invention may optionally comprise a filler E which is not a thermally conductive filler.

According to one embodiment, the organopolysiloxane composition X according to the present invention may optionally comprise a crosslinking inhibitor F. The function of the inhibitor F is to slow the hydrosilylation reaction. The crosslinking inhibitor F may be selected from the following compounds:

an organopolysiloxane, advantageously cyclic, which is substituted by at least one alkenyl, with tetramethylvinyltetrasiloxane being particularly preferred, pyridine, phosphines and organic phosphites, unsaturated amines, alkyl maleates, and acetylenic alcohols.

The crosslinking inhibitor F is preferably an acetylenic alcohol of formula $(R^1)(R^2)C(OH)-C\equiv CH$, in which:

$R^1$ is a linear or branched alkyl radical or a phenyl radical, $R^2$ is a hydrogen atom, a linear or branched alkyl radical or a phenyl radical, the radicals $R^1$ and $R^2$ and the carbon atom situated alpha to the triple bond may optionally form a ring, and the total number of carbon atoms in $R^1$ and $R^2$ is at least 5, preferably from 9 to 20.

Said alcohols are preferably selected from those having a boiling point of more than 250° C. Examples include the following commercially available products: 1-ethynyl-1-cyclohexanol, 3-methyldodec-1-yn-3-ol, 3,7,11-trimethyldodec-1-yn-3-ol, 1,1-diphenylprop-2-yn-1-ol, 3-ethyl-6-ethylnon-1-yn-3-ol, and 3-methylpentadec-1-yn-3-ol. The crosslinking inhibitor F is preferably 1-ethynyl-1-cyclohexanol.

According to the process employed for producing the silicone elastomer according to the invention, the presence of the inhibitor may be necessary or not. If required, a crosslinking inhibitor of this kind may typically be present at 3000 ppm at most, preferably at 100 ppm to 2000 ppm relative to the total weight of the organopolysiloxane composition X.

According to one embodiment, the organopolysiloxane composition X according to the present invention may optionally comprise other additives traditionally used in this technical field by the skilled person, as for example an adhesion promoter, a dye, a flame retardant, a rheological agent such as a thixotropic agent, etc.

According to one embodiment, the organopolysiloxane composition X according to the present invention may contain a low level of volatile organic compounds, typically less than 100 µgC/g, preferably less than 70 µgC/g, or else less than 50 µgC/g. For this purpose, the organopolysiloxane compounds used in the composition according to the present invention may preferably be selected from compounds which themselves contain a low level of volatile organic compounds.

According to one preferred embodiment, the organopolysiloxane composition X according to the invention comprises:

from 5% to 30%, preferably from 8% to 15%, of an organopolysiloxane A having per molecule at least two silicon-bonded $C_2$-$C_6$ alkenyl groups, from 0.1% to 10%, preferably from 0.5% to 5%, of an organopolysiloxane B having per molecule at least two SiH units, from 2 ppm to 400 ppm, preferably from 5 ppm to 200 ppm, of a hydrosilylation catalyst C, from 70% to 95%, preferably from 80% to 95%, of a thermally conductive filler D, from 0.1% to 5%, preferably from 1% to 3%, of an agent for treating the thermally conductive filler E, from 100 ppm to 3000 ppm, preferably from 100 ppm to 2000 ppm, of a crosslinking inhibitor F.

The percentages and ppms are percentages and ppms by mass. The weight amount of catalyst C is calculated as weight of platinum metal.

Another subject of the present invention is the silicone elastomer obtained or obtainable by crosslinking and/or curing the organopolysiloxane composition X as defined above, the process for obtaining said elastomer, and the intermediate compositions employed in this obtaining process.

The organopolysiloxane composition X as defined above is particularly suitable for the preparation of a silicone elastomer having heat-conducting properties.

According to one embodiment, said elastomer is prepared from a two-component system P comprising all of the components of the organopolysiloxane composition X.

More particularly, a further subject of the present invention is a two-component system P which is a precursor of the organopolysiloxane composition X as defined above, comprising at least the constituents A, B, C, and D, said two-component system P being characterized in that it takes the form of two separate parts, P1 and P2, which are intended for mixing to form said organopolysiloxane composition X, and in that one of the parts, P1 or P2, comprises the catalyst C and does not comprise the organopolysiloxane B, whereas the other part, P1 or P2, comprises the organopolysiloxane B and does not comprise the catalyst C.

Another subject of the present invention is a process for preparing a silicone elastomer, comprising the following steps:

a) supplying a two-component system P comprising all of the components of the organo-polysiloxane composition X as defined above;

b) mixing the two parts of said two-component system P to give the organopolysiloxane composition X; and c) crosslinking and/or curing said organopolysiloxane composition X to give said silicone elastomer.

According to one preferred embodiment, the part P1 comprises:

some or all of the organopolysiloxane A having per molecule at least two silicon-bonded $C_2$-$C_6$ alkenyl groups, the hydrosilylation catalyst C, some or all of the thermally conductive filler D, optionally the agent for treating the thermally conductive filler E, and the part P2 comprises:

optionally some of the organopolysiloxane A having per molecule at least two silicon-bonded $C_2$-$C_6$ alkenyl groups, the organopolysiloxane B having per molecule at least two SiH units, some or all of the thermally conductive filler D, optionally the agent for treating the thermally conductive filler E, optionally the crosslinking inhibitor F.

The thermally conductive filler D may be present in the part P1, in the part P2 or in both parts P1 and P2, with identical or different amounts between the parts P1 and P2. The thermally conductive filler D may advantageously be present in the part P1 and in the part P2, in an identical amount. Accordingly, the total amount of thermally conductive filler D remains unchanged in the organopolysiloxane composition X irrespective of the mixing rate for the parts P1 and P2.

Each of the parts P1 and P2 according to the present invention may be obtained by mixing the various components in an appropriate device known to the skilled person.

According to one particularly advantageous embodiment of the present invention, the part P1, the part P2 or both the parts P1 and P2 may be obtained from an intermediate composition comprising some or all of the organopolysiloxane A and some or all of the thermally conductive filler D, and also, optionally, the agent for treating the thermally conductive filler E.

A further subject of the present invention is an intermediate composition comprising:

at least one organopolysiloxane A having per molecule at least two silicon-bonded $C_2$-$C_6$ alkenyl groups, and a thermally conductive filler D, characterized in that said thermally conductive filler D comprises at least 40% by weight of metallic silicon, said thermally conductive filler D comprises between 3% and 22% of particles having a diameter of less than or equal to 2 μm, and the particle size distribution is such that the ratio d90/d10 of said filler is greater than or equal to 20.

Said organopolysiloxane A and said thermally conductive filler D are preferably as described above.

The total weight of the thermally conductive filler D in the intermediate composition is advantageously greater than 70%, more preferably greater than 75%, and more preferably greater than 80%, and more preferably still between 85% and 98%, by weight relative to the total weight of the intermediate composition. This intermediate composition, which is particularly rich in thermally conductive filler D, can be diluted with other components to readily obtain the organopolysiloxane composition X or precursor parts P1 and/or P2. The intermediate composition according to the present invention may be obtained by mixing at least the organopolysiloxane A and the thermally conductive filler D by means of a device known to the skilled person, as for example a Z-arm mixer or a butterfly mixer. The thermally conductive filler D may optionally undergo a surface treatment, which may be a thermal treatment, a chemical treatment, or the combination of a thermal treatment and a chemical treatment. The intermediate composition may optionally comprise an agent for treating the thermally conductive filler E, as described above. A thermal treatment may be performed on the thermally conductive filler before it is mixed into the intermediate composition. Alternatively the intermediate composition may be subjected to a thermal treatment after the mixing of the organopolysiloxane A, the thermally conductive filler D, and optionally the agent for treating the thermally conductive filler E.

The organopolysiloxane composition X, and also the parts P1 and P2 of the two-component precursor system P of the organopolysiloxane composition X, advantageously possess good processing properties. The reason is that, in spite of the presence of a very high thermally conductive filler content, said compositions are advantageously pasty and not powdery, and so are easy to manipulate, more particularly by extrusion. The inventors deserve merit for having succeeded in determining the good characteristics of the thermally conductive filler that allow this technical result to be achieved.

The silicone elastomer which is a subject of the present invention, obtained or obtainable by crosslinking and/or curing the organopolysiloxane composition X, advantageously has a thermal conduction of greater than or equal to 1 W/m·K, preferably greater than or equal to 1.5 W/m·K, more preferably greater than or equal to 2 W/m·K, more preferably greater than or equal to 3 W/m·K, and more preferably still between 3 W/m·K and 7 W/m·K.

Moreover, said silicone elastomer advantageously has a density of less than or equal to 4 g/cm$^3$, preferably less than or equal to 3 g/cm$^3$, more preferably less than 2 g/cm$^3$.

The silicone elastomer according to the present invention may advantageously easily be recycled after use. This is because this elastomer preferably contains a very high level of elemental silicon, especially when the thermally conductive filler itself contains a very high level of metallic silicon. The used silicone elastomer may advantageously be recycled using combustion furnaces.

Said silicone elastomer may advantageously be used as a thermally conductive material in various technical fields, particularly in the electronics field, in electrical applications, and in the automotive field. Said silicone elastomer may advantageously be used as a thermally conductive coating (i.e., potting) or filling (i.e., gap filler) material, particularly for batteries, as for example the batteries of electric vehicles and hybrid vehicles, but also for stationary batteries. In the electronics field, the silicone elastomer according to the invention may advantageously be used as a thermally conductive material in 5G devices.

EXAMPLES

The silicone compositions exemplified below were obtained from the following starting materials:
A: silicone oil with chain-end vinylation, having a vinyl group content of 1.2% by weight, viscosity=100 mPa·s
B1: hydrogenodimethylpolysiloxane oil with chain-end (α/ω) SiH groups, having an SiH vinyl group content of 5.7% by weight, viscosity=8.5 mPa·s
B2: poly(methylhydrogeno)(dimethyl)siloxane oil with mid-chain and chain-end (α/ω) SiH groups, having an SiH vinyl group content of 7.3% by weight, viscosity=30 mPa·s
C: Karstedt platinum catalyst, containing 10% by weight of platinum metal
D1: silicon powder (purity>99%), d10=42.3 μm, d50=70 μm, d90=112 μm, d100=200 μm
D2: silicon powder (purity>99%), d10=15 μm, d50=31.6 μm, d90=54 μm, d100=100 μm
D3: silicon powder (purity>99%), d10=6.4 μm, d50=10.4 μm, d90=16.4 μm, d100=30 μm
D4: silicon powder (purity>99%), d10=2 μm, d50=10.7 μm, d90=26 μm, d100=60 μm
D5: silicon powder (purity>99%), d10=0.9 μm, d50=2.7 μm, d90=5.3 μm, d100=10 μm
D6: silicon powder (purity>99%), d10=4.0 μm, d50=10 μm, d90=25
D7: alumina powder, d10=1 μm, d50=5.7 μm, d90=12.3 μm
D8: alumina powder, d10=18 μm, d50=46 μm, d90=73 μm
D9: alumina powder, d10=0.3 μm, d50=2.4 μm, d90=18 μm
D10: zinc oxide powder, d10=0.2 μm, d50=1.5 μm, d90=5 μm
E1: octyltrimethoxysilane
F: 1-ethynyl-1-cyclohexanol (ECH)

In the examples which follow, the particle size of the fillers is measured by a laser diffraction method:
"d10" corresponds to the characteristic diameter corresponding to 10% of the cumulative frequency volume of the particle size distribution of the filler.
"d50" corresponds to the characteristic diameter corresponding to 50% of the cumulative frequency volume of the particle size distribution of the filler.
"d90" corresponds to the characteristic diameter corresponding to 90% of the cumulative frequency volume of the particle size distribution of the filler.
"d100" corresponds to the characteristic diameter corresponding to 100% of the cumulative frequency volume of the particle size distribution of the filler.
the content of particles having a diameter of less than or equal to 2 μm is a volume content, obtained by summing the volume of all of the particles having a diameter as measured by laser diffraction of less than or equal to 2 μm.

Examples 1 to 17

Silicone compositions corresponding to the parts P1 and P2 were prepared according to the following protocol:
For the part P1: the thermally conductive filler D, the silicone oil A and the catalyst C were mixed in a Speed Mixer at 1800 revolutions per minute according to the concentration indicated in table 1 below. The concentration of thermally conductive fillers is 85%.
For the part P2: the thermally conductive filler D, the silicone oil A, silicone oils B1 and B2, and the 1-ethynyl-1-cyclohexanol F were mixed in a Speed Mixer at 1800 revolutions per minute according to the concentration indicated in table 1 below. The concentration of thermally conductive fillers is 85%.

TABLE 1

|  |  | % by weight |
|---|---|---|
| Composition of the part P1 | A | 14.96% |
|  | C | 0.04% (0.004% of Pt metal) |
|  | D | 85.00% |
| Composition of the part P2 | A | 10.78% |
|  | B1 | 2.07% |
|  | B2 | 2.07% |
|  | D | 85.00% |
|  | F | 0.08% |

Examples 1 to 17 were realized by following the production protocol described above, varying the thermally conductive filler D as described in table 2 and table 3 below.

The processing properties of the compositions obtained were evaluated visually, and classed as follows:
"--"=very poor—powdery appearance
"-"=poor—appearance of a crumble, aggregates
"+"=good—pasty appearance
"++"=very good—pasty appearance and smooth.
The results are presented in table 2 and table 3 below.

TABLE 2

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| | Composition of the thermally conductive filler D | | | | | | | | |
| D1 | 85% | 80% | 70% | 60% | 50% | 40% | 50% | | 45% |
| D2 | | | | | | | | 80% | |
| D3 | | | | | | | | | |

TABLE 2-continued

|       | Ex. 1 | Ex. 2 | Ex. 3 | Ex. 4 | Ex. 5 | Ex. 6 | Ex. 7 | Ex. 8 | Ex. 9 |
|-------|-------|-------|-------|-------|-------|-------|-------|-------|-------|
| D4    | 15%   | 20%   | 30%   | 40%   | 50%   | 60%   | 40%   |       | 40%   |
| D5    |       |       |       |       |       |       | 10%   | 20%   | 15%   |
| Characteristics of the thermally conductive filler D: |||||||||| 
| <2 µm | 1.3%  | 1.7%  | 2.6%  | 3.4%  | 4.3%  | 5.2%  | 6.7%  | 7.5%  | 8.3%  |
| d90/d10 | 7   | 10    | 15    | 20    | 24    | 29    | 34    | 19.6  | 43    |
| Processing properties of the parts P1 and P2: |||||||||| 
|       | --    | -     | --    | +     | +     | +     | ++    | -     | ++    |

TABLE 3

|       | Ex. 10 | Ex. 11 | Ex. 12 | Ex. 13 | Ex. 14 | Ex. 15 | Ex. 16 | Ex. 17 |
|-------|--------|--------|--------|--------|--------|--------|--------|--------|
| Composition of the thermally conductive filler D ||||||||| 
| D1    |        |        |        |        |        |        |        |        |
| D2    | 25%    | 50%    | 70%    | 60%    | 25%    | 50%    | 40%    | 30%    |
| D3    | 50%    | 25%    |        |        | 25%    |        |        |        |
| D4    |        |        |        |        |        |        |        |        |
| D5    | 25%    | 25%    | 30%    | 40%    | 50%    | 50%    | 60%    | 70%    |
| Characteristics of the thermally conductive filler D: ||||||||| 
| <2 µm | 8.4%   | 8.7%   | 10.6%  | 13.7%  | 16.4%  | 16.8%  | 19.9%  | 23.0%  |
| d90/d10 | 17   | 19.8   | 26     | 32     | 23     | 30     | 33     | 38     |
| Processing properties of the parts P1 and P2 ||||||||| 
| Processing properties of the parts P1 and P2 | - | - | + | ++ | + | ++ | ++ | - |

Examples 18 to 22

Examples 18 to 22 were realized by using the Speed Mixer (stirring for 2 times 2 minutes at 1800 revolutions per minute) to mix 85% of thermally conductive fillers D with 15% of silicone oil A, varying the thermally conductive filler D as described in table 4 below. The processing properties of the compositions obtained were evaluated visually as described earlier. The thermal conductivity and the density of an elastomer material obtainable from the compositions exemplified were estimated by calculation.

TABLE 4

|        | Ex. 18 | Ex. 19 | Ex. 20 | Ex. 21 | Ex. 22 |
|--------|--------|--------|--------|--------|--------|
| D1     | 43.5%  | 35.5%  | 46%    |        |        |
| D4     | 43.5%  | 35.5%  | 46%    |        |        |
| D5     |        | 13%    |        |        |        |
| D6     |        |        |        | 63%    | 63%    |
| D7     |        | 29%    |        |        |        |
| D8     |        |        |        | 37%    |        |
| D9     |        |        |        |        | 37%    |
| D10    |        |        | 8%     |        |        |
| <2 µm  | 7.9%   | 8.0%   | 8.0%   | 6.7%   | 22.6%  |
| d90/d10 | 40    | 30.3   | 23.8   | 24.6   | 35.7   |
| Processing properties of the parts P1 and P2 | + | + | + | + | — |
| Estimated thermal conductivity (W/m · K) | between 2.5 and 3.5 |||||
| Estimated density (g/cm³) | 1.94 | 2.21 | 2.10 | 2.28 | 2.28 |

Example 23

Step 1: Production of an Intermediate Composition

89% of thermally conductive fillers D, 9% of silicone oil A and 2% of octyltrimethoxysilane E1 (percentages by mass) were mixed in a Z-arm mixer for 30 minutes. The resulting composition was subjected to a thermal treatment for 2 hours at 150° C.

The thermally conductive filler D consists of 60% by weight of filler D2 and 40% by weight of filler D5. Characteristics of the filler:
  proportion of particles having a diameter of less than or equal to 2 µm=13.7%
  d90/d10=32.

Step 2: Production of the Parts P1 and P2

For the part P1: The pasted formulation obtained in step 1 is diluted with silicone oil A and catalyst C according to the concentration indicated in table 5 below. The concentration of thermally conductive fillers is 85%.

For the part P2: The pasted formulation obtained in step 1 is diluted with silicone oil A, silicone oils B1 and B2, and the 1-ethynyl-1-cyclohexanol F, according to the concentration indicated in table 5 below. The concentration of thermally conductive fillers is 85%.

These diluted formulations are obtained by mixing in a Speed Mixer at 1800 revolutions per minute.

The processing properties possessed by the parts P1 and P2 were very good.

Step 3: Production of the Thermally Conductive Silicone Composition and of the Thermally Conductive Silicone Elastomer The parts P1 and P2 obtained in step 2 were mixed in a proportion of 1:1 in the Speed Mixer. The mixture obtained was degassed under reduced pressure and then poured into a mold. The mixture in the mold was then placed into a heating press at a pressure of 2 bar at 100° C. for 30 minutes.

TABLE 5

|                       |     | % by weight |
|-----------------------|-----|-------------|
| Composition of the part P1 | A   | 13.05%      |
|                       | C   | 0.04% (0.004% of Pt metal) |
|                       | D   | 85.00%      |
|                       | E1  | 1.91%       |
| Composition of the part P2 | A   | 8.87%       |
|                       | B1  | 2.06%       |
|                       | B2  | 2.06%       |

TABLE 5-continued

|  |  | % by weight |
|---|---|---|
|  | D | 85.00% |
|  | E1 | 1.91% |
|  | F | 0.09% |
| Final composition of the silicone composition (P1 + P2) | A | 10.96% |
|  | B1 | 1.03% |
|  | B2 | 1.03% |
|  | C | 0.02% (0.002% of Pt metal) |
|  | D | 85.00% |
|  | E1 | 1.91% |
|  | F | 0.05% |

The thermal conductivity of the elastomer was measured according to the transient plane source method (TPS method) as described in ISO standard 22007-2 ("Determination of thermal conductivity and thermal effusivity. Part 2: Transient plane heat source (hot disk) method") by means of a Hot Disk TPS 2200 device. The thermal conductivity of the elastomer was 3.42 W/m·K. The density of the elastomer was 1.94 g/cm$^3$.

The invention claimed is:

1. An organopolysiloxane composition X comprising:
   at least one organopolysiloxane A having per molecule at least two silicon-bonded $C_2$-$C_6$ alkenyl groups,
   at least one organopolysiloxane B having per molecule at least two SiH units,
   a catalytically effective amount of at least one hydrosilylation catalyst C, and
   a thermally conductive filler D,
   wherein
   said thermally conductive filler D comprises at least 40% by weight of metallic silicon,
   said thermally conductive filler D comprises between 3% and 22% of particles having a diameter of less than or equal to 2 μm, and the particle size distribution is such that the ratio d90/d10 of said filler is greater than or equal to 20.

2. The organopolysiloxane composition X as claimed in claim 1, wherein the total weight of the thermally conductive filler D in the organopolysiloxane composition X is between 80% and 95%.

3. The organopolysiloxane composition X as claimed in claim 1, wherein said thermally conductive filler D comprises between 3% and 20%, optionally between 6% and 18%, of particles having a diameter of less than or equal to 2 μm.

4. The organopolysiloxane composition X as claimed in claim 1, wherein the particle size distribution is such that the ratio d90/d10 of said filler is greater than or equal to 30.

5. The organopolysiloxane composition X as claimed in claim 1, wherein said thermally conductive filler D comprises at least 70% by weight of metallic silicon.

6. The organopolysiloxane composition X as claimed in claim 1, wherein said thermally conductive filler D comprises 100% by weight of metallic silicon.

7. The organopolysiloxane composition X as claimed in claim 1, wherein the thermally conductive filler D comprises not only metallic silicon but also a thermally conductive filler selected from the group consisting of an alumina filler, an aluminum trihydrate filler, an aluminum filler, a silica filler, a zinc oxide filler, an aluminum nitride filler, a boron nitride filler, and mixtures thereof.

8. The organopolysiloxane composition X as claimed in claim 1, comprising:
   from 5% to 30%, optionally from 8% to 15%, of an organopolysiloxane A having per molecule at least two silicon-bonded $C_2$-$C_6$ alkenyl groups,
   from 0.1% to 10%, optionally from 0.5% to 5%, of an organopolysiloxane B having per molecule at least two SiH units,
   from 2 ppm to 400 ppm, optionally from 5 ppm to 200 ppm, of a hydrosilylation catalyst C,
   from 70% to 95%, optionally from 80% to 95%, of a thermally conductive filler D,
   from 0.1% to 5%, optionally from 1% to 3%, of an agent for treating the thermally conductive filler E,
   from 100 ppm to 3000 ppm, optionally from 100 ppm to 2000 ppm, of a crosslinking inhibitor F.

9. A two-component system P which is a precursor of the organopolysiloxane composition X as defined in claim 1 comprising the constituents A, B, C, and D, said two-component system P comprising two separate parts, P1 and P2, which are intended for mixing to form said organopolysiloxane composition X, and wherein one of the parts, P1 or P2, comprises the catalyst C and does not comprise the organopolysiloxane B, whereas the other part, P1 or P2, comprises the organopolysiloxane B and does not comprise the catalyst C.

10. A silicone elastomer obtainable by crosslinking and/or curing the organopolysiloxane composition X as defined in claim 1.

11. A process for preparing a silicon elastomer, said process comprising:
   a) supplying a two-component system P comprising all of the components of the organo-polysiloxane composition X as defined in claim 1;
   b) mixing the two parts of said two-component system P to give the organopolysiloxane composition X; and
   c) crosslinking and/or curing said organopolysiloxane composition X to give said silicone elastomer.

12. A product comprising the silicone elastomer as defined in claim 10 wherein said product comprises a thermally conductive coating or filling material, optionally in an electronics field, in an electrical application, and/or in an automotive field.

13. An intermediate composition comprising:
   at least one organopolysiloxane A having per molecule at least two silicon-bonded $C_2$-$C_6$ alkenyl groups, and
   a thermally conductive filler D,
   wherein
   said thermally conductive filler D comprises at least 40% by weight of metallic silicon,
   said thermally conductive filler D comprises between 3% and 22% of particles having a diameter of less than or equal to 2 μm, and the particle size distribution is such that the ratio d90/d10 of said filler is greater than or equal to 20.

* * * * *